United States Patent
Li et al.

(10) Patent No.: US 11,164,682 B1
(45) Date of Patent: Nov. 2, 2021

(54) CONTROL ROD DRIVE MECHANISM AND REACTOR CONTROL SYSTEM

(71) Applicant: Sichuan University, Sichuan (CN)

(72) Inventors: Wenqiang Li, Sichuan (CN); Hongbiao Sun, Sichuan (CN); Song Li, Sichuan (CN); Wu Zhao, Sichuan (CN); Kai Wang, Sichuan (CN); Zihao Cheng, Sichuan (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 17/356,844

(22) Filed: Jun. 24, 2021

(30) Foreign Application Priority Data

Jul. 22, 2020 (CN) .......................... 202011005393.7

(51) Int. Cl.
*G21C 7/14* (2006.01)
*G21C 9/02* (2006.01)
*G21C 7/12* (2006.01)

(52) U.S. Cl.
CPC .................. *G21C 7/14* (2013.01); *G21C 7/12* (2013.01); *G21C 9/02* (2013.01)

(58) Field of Classification Search
CPC ............... G21C 7/12; G21C 7/14; G21C 9/02
See application file for complete search history.

(56) References Cited

U.S. PATENT DOCUMENTS

| | | | | | |
|---|---|---|---|---|---|
| 3,625,816 | A | * | 12/1971 | Aleite | G21C 7/14 376/225 |
| 4,110,157 | A | * | 8/1978 | Jabsen | G21C 7/12 376/233 |
| 4,411,857 | A | * | 10/1983 | Sridhar | G21C 7/12 376/233 |
| 4,412,968 | A | * | 11/1983 | Sridhar | G21C 7/12 376/233 |
| 4,713,210 | A | * | 12/1987 | Germer | G21C 9/02 376/233 |
| 4,885,123 | A | | 12/1989 | Ikeuchi et al. | |

(Continued)

FOREIGN PATENT DOCUMENTS

| CN | 205111837 U | 3/2016 |
|---|---|---|
| CN | 109969980 A | 7/2019 |
| DE | 2211756 A1 | 9/1973 |

*Primary Examiner* — Sharon M Davis (57) ABSTRACT

This disclosure relates to reactor control, and more particularly to a control rod drive mechanism and a reactor control system. The control rod drive mechanism includes a lifting-lowering assembly, a mounting assembly and a release assembly. The mounting assembly is configured to mount a control rod. The lifting-lowering assembly includes a fixing component, a scissor-type lifting-lowering mechanism and a lifting-lowering component. An end of the scissor-type lifting-lowering mechanism is connected to the fixing component, and the other end is connected to the lifting-lowering component. The scissor-type lifting-lowering mechanism is configured to drive the lifting-lowering component to move close to or away from the fixing component. The release assembly is movably arranged on the lifting-lowering component, and is detachably connected to the mounting assembly. The release assembly is configured to move relative to the lifting-lowering component when power is off to release the mounting assembly.

9 Claims, 3 Drawing Sheets

(56) References Cited

U.S. PATENT DOCUMENTS

| | | | | |
|---|---|---|---|---|
| 5,059,386 A | * | 10/1991 | Farello | G21C 9/02 376/336 |
| 2014/0270036 A1 | * | 9/2014 | Dodd | G21C 7/14 376/219 |
| 2015/0325318 A1 | * | 11/2015 | Singh | G21C 7/12 376/228 |

* cited by examiner

CONTROL ROD DRIVE MECHANISM AND REACTOR CONTROL SYSTEM

CROSS-REFERENCE TO RELATED APPLICATIONS

This application claims the benefit of priority from Chinese Patent Application No. 202011005393.7, filed on Sep. 22, 2020. The content of the aforementioned applications, including any intervening amendments thereto, is incorporated herein by reference in its entirety.

TECHNICAL FIELD

This application relates to reactor control, and more particularly to a control rod drive mechanism and a reactor control system.

BACKGROUND

A control rod drive mechanism is configured in the reactor control system to drive the rising and lowering of the control rod.

Currently, limited by the available space in the reactor control system, the commercially-available control rod drive mechanism usually drives the control rod to rise and fall through a stepped reciprocating motion. Therefore, the existing control rod drive mechanism generally has a short lifting stroke, a discontinuous lifting process and a low response speed for large moving distance.

SUMMARY

An object of this application is to provide a control rod drive mechanism to overcome the defects in the prior art, which has small space occupation, and can drive the control rod to continuously rise and fall.

Another object of this application is to provide a reactor control system, which can create larger usable space and drive the control rod to continuously rise and fall.

The technical solutions of this application are described as follows.

In a first aspect, this application provides a control rod drive mechanism, comprising:

a lifting-lowering assembly;
a mounting assembly; and
a release assembly;
wherein the mounting assembly is configured to mount a control rod;

the lifting-lowering assembly comprises a fixing component, a scissor-type lifting-lowering mechanism and a lifting-lowering component; an end of the scissor-type lifting-lowering mechanism close to the fixing component is connected to the fixing component, and an end of the scissor-type lifting-lowering mechanism away from the fixing component is connected to the lifting-lowering component; the scissor-type lifting-lowering mechanism is configured to drive the lifting-lowering component to move close to or away from the fixing component; and the release assembly is movably arranged on the lifting-lowering component, and is detachably connected to the mounting assembly; and the release assembly is configured to move relative to the lifting-lowering component when power is off, so as to release the mounting assembly.

In some embodiments, the release assembly comprises a slidable main body, an electromagnet, a fixing base and a first elastic component; the slidable main body is in sliding fit with the lifting-lowering component; the mounting assembly is detachably connected to the slidable main body; the electromagnet and the fixing base are arranged on the lifting-lowering component; two ends of the first elastic component are respectively connected to the fixing base and the slidable main body; the electromagnet is configured to attract the slidable main body when power is on; and the first elastic component is configured to drive the slidable main body to move on the lifting-lowering component in a direction away from the electromagnet when power is off, so as to disconnect the slidable main body from the mounting assembly.

In some embodiments, the slidable main body comprises a support frame, a first support block, a second support block and an armature; the support frame is in sliding fit with the lifting-lowering component; the armature is arranged on an outer wall of an end of the support frame near the electromagnet; the first support block and the second support block are arranged spaced apart on an inner wall of an end of the support frame away from the electromagnet; and the mounting assembly is straddledly arranged between the first support block and the second support block.

In some embodiments, a side of the lifting-lowering component close to the fixing component is provided with a guide sliding groove; the slidable main body is in sliding fit with the guide sliding groove; the electromagnet and the fixing base are arranged in the guide sliding groove; a bottom wall of the guide sliding groove is penetratedly provided with a release hole; the mounting assembly penetrates through the release hole to be detachably connected to the slidable main body; and when the mounting assembly is disconnected from the slidable main body, the mounting assembly moves in a direction away from the slidable main body through the release hole.

In some embodiments, the mounting assembly comprises a mounting component and a straddling component; an end of the straddling component close to the mounting component is connected to a side of the mounting component; an end of the straddling component away from the mounting component is straddledly provided on the release assembly; and a side of the mounting component away from the straddling component is configured for arrangement of a plurality of control rods.

In some embodiments, the mounting assembly further comprises a second elastic component; an end of the second elastic component close to the mounting component is arranged on a side of the mounting component close to the release assembly; and an end of the second elastic component away from the mounting component abuts against a side of the lifting-lowering component away from the fixing component.

In some embodiments, the scissor-type lifting-lowering mechanism comprises a scissor-type bracket and a drive component; the drive component is arranged on the fixing component; two ends of the scissor-type bracket are respectively connected to the fixing component and the lifting-lowering component; and a movable side of an end of the scissor-type bracket connected to the fixing component is connected to an output end of the drive component, so as to slide on the fixing component under drive of the drive component.

In some embodiments, the scissor-type lifting-lowering mechanism further comprises a connecting rod; the scissor-type bracket comprises a plurality of scissor-type brackets; a movable side of an end of each of the plurality of scissor-type brackets connected to the fixing component is connected via the connecting rod; the output end of the drive component is connected to the connecting rod; and the connecting rod is configured to drive the movable side of the end of each of the plurality of scissor-type brackets to synchronously slide on the fixing component under drive of the drive component.

In some embodiments, a first slide rail is provided on the fixing component; a first pulley is provided on the movable side of the end of each of the plurality of scissor-type brackets connected to the fixing component; the first pulley is in sliding fit with the first slide rail; a second slide rail is provided on the lifting-lowering component; a second pulley is provided on a movable side of an end of each of the plurality of scissor-type brackets connected to the lifting-lowering component; the second pulley is in sliding fit with the second slide rail; and the second slide rail is parallel to the first slide rail.

In a second aspect, this application provides a reactor control system, comprising:

a control rod drive mechanism;

wherein the control rod drive mechanism comprises a lifting-lowering assembly, a mounting assembly and a release assembly; the mounting assembly is configured to mount a control rod; the lifting-lowering assembly comprises a fixing component, a scissor-type lifting-lowering mechanism and a lifting-lowering component; an end of the scissor-type lifting-lowering mechanism close to the fixing component is connected to the fixing component, and an end of the scissor-type lifting-lowering mechanism away from the fixing component is connected to the lifting-lowering component; the scissor-type lifting-lowering mechanism is configured to drive the lifting-lowering component to move close to or away from the fixing component; the release assembly is movably arranged on the lifting-lowering component, and is detachably connected to the mounting assembly; and the release assembly is configured to move relative to the lifting-lowering component when power is off so as to release the mounting assembly.

Compared with the prior art, this application has the following beneficial effects. This application provides a control rod drive mechanism, of which the lifting-lowering assembly includes a fixing component, a scissor-type lifting-lowering mechanism and a lifting-lowering component. The fixing component drives the lifting-lowering component to continuously rise and fall through the scissor-type lifting-lowering mechanism. The release assembly is movably arranged on the lifting-lowering component. The mounting assembly and the release assembly are detachably connected, and the mounting assembly is configured to mount the control rod. In practical applications, the control rod is arranged on the mounting assembly, and the scissor-type lifting-lowering mechanism drives the mounting assembly to perform continuous rising-falling movement through the lifting-lowering component and the release assembly, thereby driving the control rod to perform continuous—rising-falling motion. Compared with the stepping moving mechanism in the prior art, this application realizes the continuous rising-falling control of the control rod and improves the response speed of the control rod. In addition, the scissor-type lifting-lowering mechanism has the function of enlarging the stroke and requires less mounting space, realizing the long-distance rising-falling of the control rod. Therefore, the control rod drive mechanism provided herein has a smaller mounting space and a faster response speed, and significantly increases the lifting stroke of the control rod.

BRIEF DESCRIPTION OF THE DRAWINGS

Technical solutions of this application will be more clearly described below with reference to the accompanying drawings and embodiments. Obviously, presented in the drawings are only some embodiments of the present application, which are not intended to limit the application. For those of ordinary skill in the art, other drawings can be obtained based on the accompanying drawings provided herein without paying any creative efforts.

In the drawings, 100, control rod drive mechanism; 110, lifting-lowering assembly; 111, fixing component; 1111, first slide rail; 113, scissor-type lifting-lowering mechanism; 1131, scissor-type bracket; 1132, first pulley; 1133, drive component; 1134, second pulley; 1135, connecting rod; 115, lifting-lowering component; 1151, second slide rail; 1153, guide sliding groove; 1154, release hole; 130, release assembly; 131, slidable main body; 1311, support frame; 1312, release space; 1313, first support block; 1315, second support block; 1317, armature; 133, electromagnet; 135, fixing base; 137, first elastic component; 150, mounting assembly; 151, mounting component; 153, straddling component; and 155, second elastic component.

DETAILED DESCRIPTION OF EMBODIMENTS

In order to render the objects, technical solutions and beneficial effects of the disclosure clearer, the disclosure will be described below in detail in conjunction with accompanying drawings and embodiments. It should be understood that these embodiments are merely illustrative of the disclosure, and are not intended to limit the disclosure. The components illustrated in the drawings herein may be arranged and designed in various different configurations.

Therefore, the detailed description of the embodiments presented in the accompanying drawings is merely intended to enable those skilled in the art to implement or use the disclosure, and is not intended to limit the scope of the present disclosure.

It should be noted that similar reference numerals and letters indicate similar items in the following drawings. Therefore, once a certain item is defined in one drawing, it does not need to be further defined and explained in the subsequent drawings.

It should be noted that direction and position relationships indicated by terms such as up, down, inner, outer, left, right, etc. are based on the direction and position relationships shown in the drawings, or the direction and position relationship in which the product claimed herein is usually placed in use, or the direction and position relationship commonly understood by those skilled in the art. These terms are only for the convenience of describing the technical solutions and simplifying the description, rather than indicating or implying that the device or element referred to must have a specific orientation, or be configured and operated in a specific orientation, and therefore cannot be understood as a limitation to the present disclosure.

It should be noted that the terms such as "first" and "second" are only used for descriptive purposes, and cannot be understood as indicating or implying their relative importance.

As used herein, it should also be noted that, unless otherwise clearly specified and limited, terms such as "arrange" and "connect" should be understood in a broad sense. For example, "connect" can be a fixed connection, or a detachable connection, or an integral connection, or a mechanical connection, or electrical connection; or direct connection or indirect connection through an intermediate medium; or internal communication between two components. For those of ordinary skill in the art, the specific meaning of the above-mentioned terms can be understood according to specific circumstances.

The disclosure will be further described below in detail with reference to the accompanying drawings and the embodiments.

Embodiment 1

Figure 1:
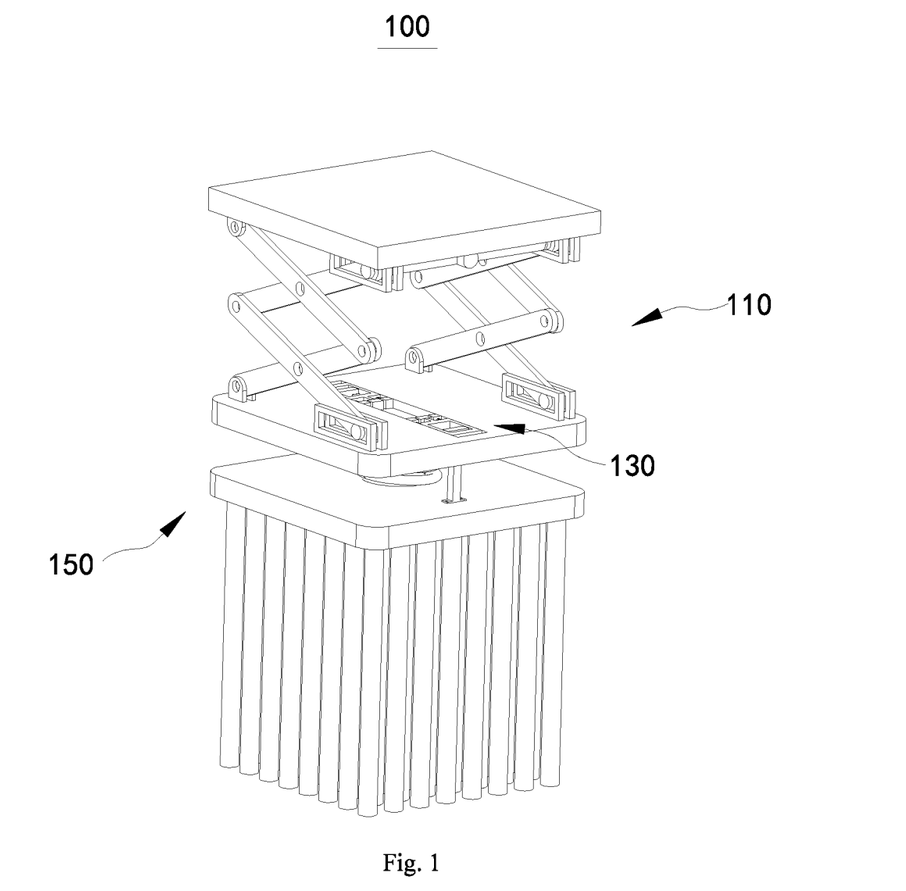
FIG. 1 a schematically depicts a connection between a control rod drive mechanism according to Embodiment 1 of the disclosure and a control rod.

As shown in FIG. 1, a control rod drive mechanism 100 is provided in this embodiment, which is applied to a reactor control system to drive the control rod in the reactor to rise and fall. The control rod drive mechanism 100 has small space occupation and better applicability, and facilitates saving the available space of the reactor control system. Moreover, it also has a faster response speed, which greatly improves the lifting stroke of the control rod.

The control rod drive mechanism 100 provided herein includes a lifting-lowering assembly 110, a release assembly 130 and a mounting assembly 150. The release assembly 130 is movably arranged on the lifting-lowering assembly 110. The mounting assembly 150 and the release assembly 130 are detachably connected for mounting the control rod. The lifting-lowering assembly 110 drives the mounting assembly 150 and the control rod to rise and fall through the continuously lifting and lowering the release assembly 130, and control the control rod can be fall back to the reactor after power off through releasing the mounting assembly 150 by the release assembly 130 when the power is cut off, which complies with industry safety regulations.

Figure 2:
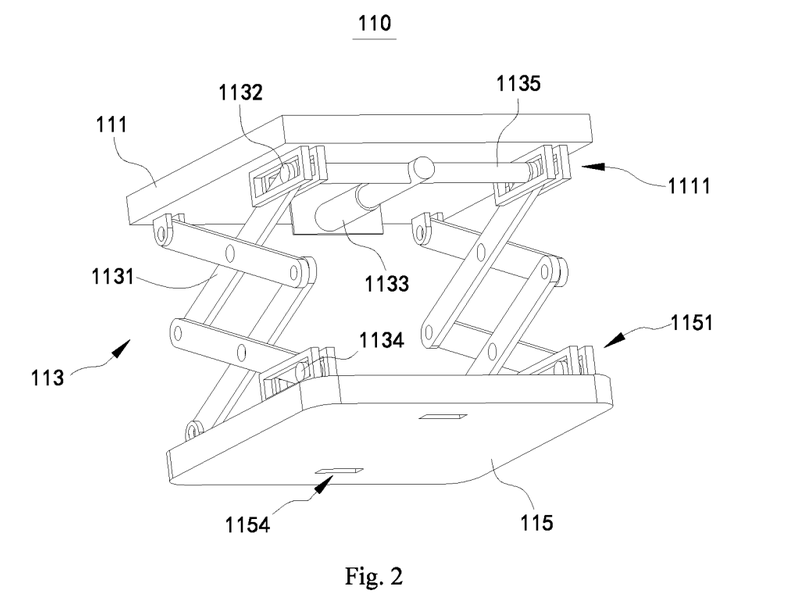
FIG. 2 is a schematic diagram of a lifting-lowering assembly according to an embodiment of the disclosure.

As shown in FIGS. 1 and 2, the lifting-lowering assembly 110 includes a fixing component 111, a scissor-type lifting-lowering mechanism 113 and a lifting-lowering component 115. An end of the scissor-type lifting-lowering mechanism 113 close to the fixing component is connected to the fixing component 111, and an end of the scissor-type lifting-lowering mechanism 113 away from the fixing component 111 is connected to the lifting-lowering component 115. Through the relative rotation of the scissor-type arm and the connecting rod, the lifting-lowering component 115 of the scissor-type lifting-lowering mechanism 113 moves close to or away from the fixing component 111. In practical application, the fixing component 111 is fixedly arranged in the reactor control system, and the scissor-type lifting-lowering mechanism 113 is extended in the vertical direction to realize the lifting and lowering of the lifting-lowering component 115.

In the control rod drive mechanism 100, a scissor-type lifting-lowering mechanism 113 is used instead of a traditional stepping moving mechanism, which can drive the control rod to continuously rise and fall and has a higher response speed. In addition, the scissor-type lifting-lowering mechanism 113 can enlarge the lift stroke of the control rod, and achieve a larger moving stroke in a limited space.

The scissor-type lifting-lowering mechanism 113 includes a scissor-type bracket 1131 and a drive component 1133. Two ends of the scissor-type bracket 1131 are respectively connected to the fixing component 111 and the lifting-lowering component 115. The drive component 1133 is arranged on an end of the fixing component 111 close to the lifting-lowering component 115. In this embodiment, the two scissor-type arms corresponding to an end of the scissor-type bracket 1131 connected to the fixing component 111 are respectively set as a fixed side and a movable side. The fixed side is hinged to the fixing component 111, and the movable side is in sliding fit with a side of the fixing component 111 close to the lifting-lowering component 115. During the movement process of the movable side towards the fixed side on the fixing component 111, the scissor-type bracket 1131 continues to stretch, thereby driving the lifting-lowering component 115 to continue to fall. During the movement process of the movable side away from the fixed side on the fixing component 111, the scissor-type bracket 1131 continues to retract, thereby driving the lifting-lowering component 115 to continue to rise.

In this embodiment, in order to ensure the smooth progress of the lifting process, the scissor-type bracket 1131 includes two scissor-type brackets 1131, and the two scissor-type brackets 1131 are opposed and arranged spaced apart between the fixing component 111 and the lifting-lowering component 115.

In order to ensure the synchronous stretch and retract of the two scissor-type brackets 1131, thereby ensuring the smooth lifting and lowering of the lifting-lowering component 115, the scissor-type lifting-lowering mechanism 113 further includes a connecting rod 1135. The two scissor-type brackets 1131 are connected to the movable side of an end of the fixing component 111 by a connecting rod 1135. The drive component 1133 is arranged on the side of the fixing component 111 close to the lifting-lowering component 115, and the output end of the drive component 1133 is connected to the connecting rod 1135 for driving the connecting rod 1135 to move on the surface of the fixing component 111. Furthermore, the two scissor-type brackets 1131 are connected to the movable side of an end of the fixing component 111 to slide synchronously on the surface of the fixing component 111, so as to realize the smooth lifting and lowering of the lifting-lowering component 115. It can be seen that the scissor-type lifting-lowering mechanism 113 adopted in this embodiment converts a short-stroke horizontal movement into a long-stroke vertical movement. In practical applications, the lifting stroke and lowering stroke of the control rod are enlarged.

In this embodiment, to ensure the stability of the movement process, the drive component 1133 adopts an oil cylinder. The oil cylinder is arranged on the side of the fixing component 111 close to the lifting-lowering component 115, and the extension direction of the piston rod is parallel to the surface at a side of the fixing component 111 close to the lifting-lowering component 115, the end of the piston rod is perpendicular to and is connected the connecting rod 1135. The two scissor-type brackets 1131 is driven by the connecting rod 1135 and are respectively connected to the movable side of an end of the fixing component 111 to slide synchronously on the surface of the fixing component 111, so as to realize the smooth lifting and lowering of the lifting-lowering component 115. In some embodiments, other drive devices such as air cylinders can also be used to meet the requirements of stable output.

In addition, according to the actual application environment and the actual load on the lifting-lowering component 115, in other embodiments, the number of scissor-type brackets 1131 can be adjusted adaptively.

Two first slide rails 1111 are arranged in parallel and spaced apart on the side of the fixing component 111 close to the lifting-lowering component 115. The movable side of an end of the fixing component 111 connected to the two scissor-type brackets 1131 is respectively provided with a first pulley 1132, and the two first pulleys 1132 are in sliding fit with the two first slide rails 1111 respectively. The connecting rod 1135 is arranged between the two first slide rails 1111, and is perpendicular to the two first slide rails 1111 simultaneously. The connecting rod 1135 drives the two first pulleys 1132 to slide synchronously along the two first slide rails 1111 under the action of the drive component 1133.

Two second slide rails 1151 are arranged in parallel and spaced apart on the side of the lifting-lowering component 115 close to the fixing component 111, and each of the second slide rails 1151 is parallel to the first slide rail 1111. The movable side of an end of the lifting-lowering component 115 connected to the two scissor-type brackets 1131 is respectively provided with a second pulley 1134, and the two second pulleys 1134 are in sliding fit with the two second slide rails 1151 respectively. The fixed side of an end of the lifting-lowering component 115 connected to the two scissor-type brackets 1131 is respectively hinged to a side of the lifting-lowering component 115 close to the fixing component 111.

When the two first pulleys 1132 slide along the two first slide rails 1111 under drive of the connecting rod 1135, the two second pulleys 1134 are driven to slide along the two second slide rails 1151 in the same direction through the scissor arms and the connecting rod 1135.

The release component 130 is movably arranged on the lifting-lowering component 115 and detachably connected to the mounting component 150. The release component 130 is configured to move relative to the lifting-lowering component 115 when the power is off, so as to be disconnected from the mounting component 150. In practice, the control rods are mounted to the mounting assembly 150, and release of the control rods is achieved when the release assembly 130 is disconnected from the mounting assembly 150.

Figure 3:
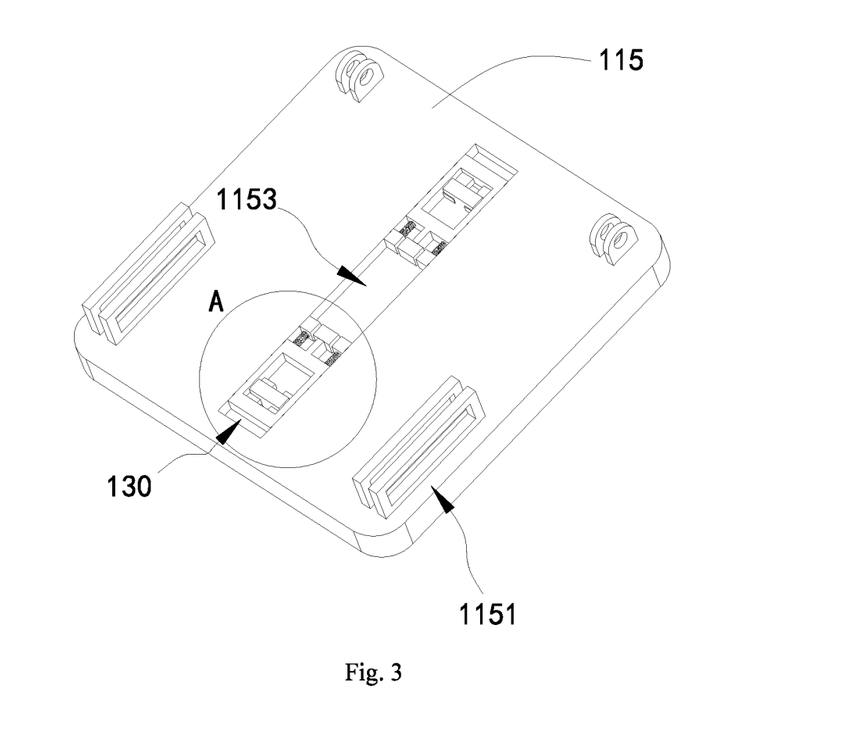
FIG. 3 schematically shows a connection of a release assembly, the lifting-lowering assembly and a mounting assembly according to an embodiment of the disclosure.
Figure 4:
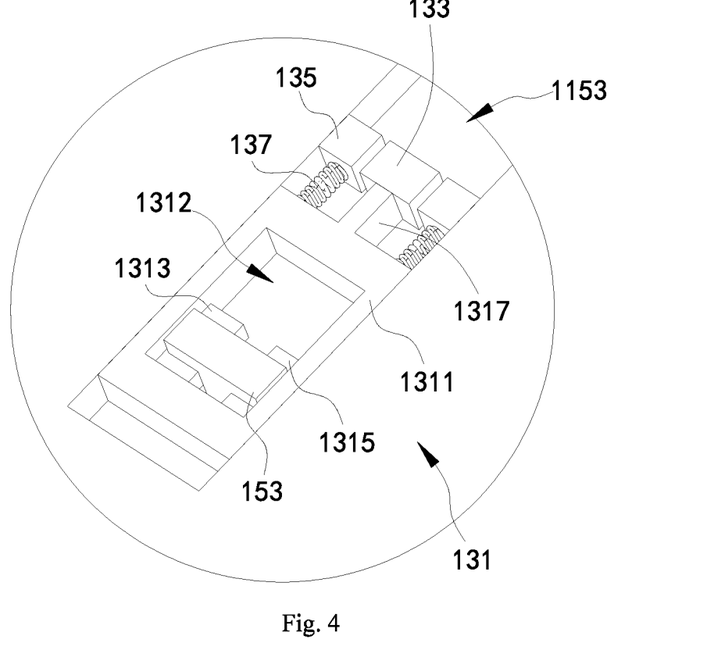
FIG. 4 is an enlarged view of area A in FIG. 3.

As shown in FIGS. 1, 3 and 4, the release assembly 130 includes a slidable main body 131, an electromagnet 133, a fixing base 135 and a first elastic component 137. The slidable main body 131 is in sliding fit with the lifting-lowering component 115. The mounting assembly 150 and slidable main body 131 are detachably connected. The electromagnet 133 and the fixing base 135 are fixedly arranged on the lifting-lowering component 115 respectively. Two ends of first elastic component 137 are connected to the fixing base 135 and the slidable main body 131, respectively.

In the process that the lifting-lowering assembly 110 drives the control rod to lift through the release assembly 130 and the mounting assembly 150, the electromagnet 133 keeps an electrified state and attracts the slidable main body 131, and the elastic potential energy is accumulated on the first elastic component 137. When the electromagnet 133 is de-energized, the slidable main body 131 moves away from the electromagnet 133 under an action of the first elastic component 137, so as to be disconnected from the mounting assembly 150.

In this embodiment, the first elastic component 137 is a spring. The electromagnet 133 and the fixing base 135 are both arranged at the same end of the slidable main body 131. An end of the spring is connected to an end of the slidable main body 131 close to the electromagnet 133, and an end of the spring away from the slidable main body 131 is connected to a side of the fixing base 135 close to the slidable main body 131. When the electromagnet 133 is in the energized state, the slidable main body 131 is attracted to the electromagnet 133, and the spring is in a compressed state. When the electromagnet 133 is de-energized, the spring relaxes to push the slidable main body 131 to move away from the electromagnet 133 on the lifting-lowering component 115.

The slidable main body 131 includes a support frame 1311, a first support block 1313, a second support block 1315 and an armature 1317. The support frame 1311 is in sliding fit with the lifting-lowering component 115. The armature 1317 is arranged on an outer wall of an end of the support frame 1311 close to the electromagnet 133, which is used to attract the electromagnet 133 by the action of the magnetic field when the electromagnet 133 is energized. The first support block 1313 and the second support block 1315 are respectively arranged spaced apart on the inner wall of the end of the support frame 1311 away from the electromagnet 133, and the mounting assembly 150 is straddledly arranged between the first support block 1313 and the second support block 1315.

The first support block 1313 and the second support block 1315 are respectively arranged on an inner wall of an end of the support frame 1311 away from the electromagnet 133. An inner wall of an end of the support frame 1311 close to the electromagnet 133 is enclosed to form a release space 1312. When the electromagnet 133 is energized, the mounting assembly 150 is straddled between the first support block 1313 and the second support block 1315. When the electromagnet 133 is de-energized, under the action of the first elastic component 137, the first support block 1313 and the second support block 1315 move in a direction away from the electromagnet 133 relative to the mounting assembly 150, that is, the mounting assembly 150 moves in a direction close to the electromagnet 133 relative to the support frame 1311. When the first support block 1313 and the second support block 1315 are disconnected from the mounting assembly 150, the mounting assembly 150 falls into the release space 1312 in the support frame 1311, and then falls out of the support frame 1311 from the release space 1312, completing the release of the mounting assembly 150.

In this embodiment, a side of the lifting-lowering component 115 close to the fixing component 111 is recessed with a guide sliding groove 1153, and the support frame 1311 is arranged in the guide sliding groove 1153 and is in sliding fit with the guide sliding groove 1153. The electromagnet 133 and the fixing base 135 are respectively fixedly arranged in the guide sliding groove 1153 and correspond to a same end of the support frame 1311. When the electromagnet 133 is suddenly de-energized, under the action of the first elastic component 137, the support frame 1311 is slid along the guide sliding groove 1153 in a direction away from the electromagnet 133.

Considering the stability of the lifting process of the mounting assembly 150, in this embodiment, two release assemblies 130 are provided. The extending direction of the guide sliding groove 1153 is in the direction of the central axis of the lifting-lowering component 115. The two release assemblies 130 are symmetrically arranged at both ends of the guide sliding groove 1153 respectively, and are connected to the mounting assembly 150 and release the mounting assembly 150 at the same time. In some embodiments, the number of the release component 130 can also be adjusted adaptively according to the specific application environment and the actual load of the mounting component 150, and the number and arrangement of the guide sliding groove 1153 can be adjusted accordingly.

To ensure the smooth release of the mounting assembly 150, a release hole 1154 penetrates through the bottom wall of the guide sliding groove 1153, and the mounting assembly 150 passes through the release hole 1154 to straddle between the first support block 1313 and the second support block 1315 in the support frame 1311 to ensure that the control rod is released after the mounting assembly 150 is slid onto the release spaces 1312 by the first support block 1313 and second support block 1315 and then moved in a direction away from the fixing component 111.

Figure 5:
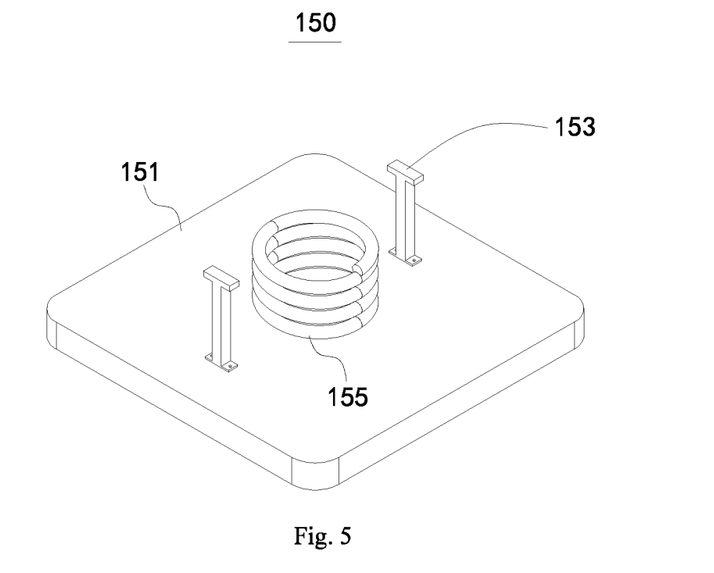
FIG. 5 is a schematic diagram of the mounting assembly in FIG. 1.

As shown in FIGS. 1 and 5, in this embodiment, the mounting assembly 150 includes a mounting component 151, a straddling component 153 and a second elastic component 155. An end of the straddling component 153 close to the mounting component is connected to a side of the mounting component 151. An end of the straddling component 153 away from the mounting component 151 penetrates through the release hole 1154 and straddledly provided between the first support block 1313 and the second support block 1315.

Corresponding to the number of release component 130, two straddling components 153 are provided, and each end of the two straddling components 153 is respectively connected to two symmetrical center positions on a side of the mounting component 151. An end of each of the two straddling components 153 away from the mounting component 151 is straddledly arranged on the first support block 1313 and the second support block 1315 in the support frame 1311 of the two release assemblies 130 respectively. The side of the mounting component 151 away from the lifting-lowering component 115 is configured to mount the control rod. An end of the second elastic component 155 is arranged on the side of the mounting component 151 close to the lifting-lowering component 115, and the end of the second elastic component 155 away from the mounting component 151 abuts against a side of the lifting-lowering component 111 close to the mounting component 151.

The second elastic component 155 is in a compressed state. When the electromagnet 133 is de-energized, the support frame 1311 slides along the guide sliding groove 1153 in a direction away from the electromagnet 133, and the two straddling components 153 slide into the two release spaces 1312 at the same time. In addition, the second elastic component 155 relaxes to release the elastic potential energy, so as to push the mounting component 151 to move in a direction away from the lifting-lowering component 115. In practice, the mounting component 151 is pushed to fall quickly, thereby realizing the quick release of the control rod.

In this embodiment, the straddling component 153 is an I-shaped steel. In order to reduce the static friction between the I-shaped steel and the first support block 1313 and the second support block 1315, so that the I-shaped steel can be smoothly slid from the first support block 1313 and the second support block 1315 into the release space 1312, the straddling component 153 can also be made of other materials with an I-shape and a smaller surface roughness. Similarly, the first support block 1313 and the second support block 1315 are made of a material with a small surface roughness.

In addition, in this embodiment, the mounting component 151 is a plate, and an end of the mounting component 151 away from the lifting-lowering component 115 can be mounted with a plurality of control rods at the same time, which realizes the simultaneous control of the plurality of control rods.

This application provides the control rod drive mechanism 100. A plurality of control rods are mounted on the side of the mounting component 151 away from the lifting-lowering component 115, and the two straddling components 153 are respectively straddledly arranged on the first support block 1313 and the second support block 1315 in the two support frames 1311. The electromagnet 133 is energized, the armature 1317 provided on the outer wall of the support frame 1311 is attracted on the surface of the electromagnet 133, and the first elastic component 137 and the second elastic component 155 are in compressed state. The drive component 1133 pushes the connecting rod 1135 to move in the horizontal direction, and drives the first pulley 1132 to slide back and forth along the first guide rail, thereby realizing the lifting and lowering of the lifting-lowering component 115.

When the electromagnet 133 is de-energized suddenly, the support frame 1311 slides along the guide sliding groove 1153 away from the electromagnet 133 under the action of the first elastic component 137, so as to drive the first support block 1313 and the second support block 1315 to disconnect from the straddling component 153, and the straddling component 153 slides into the release space 1312. When the straddling component 153 slides into the release space 1312, the second elastic component 155 stretches to push the mounting component 151 to fall vertically, and the mounting component 151 drives the straddling component 153 to quickly exit the release hole 1154, and drives multiple control rods to fall quickly, realizing the quick release of the plurality of the control rods.

Therefore, the control rod drive mechanism 100 provided herein has a smaller mounting space requirement, wider applicability, saves available space for the reactor control system, and has a faster response speed, which greatly increases the lifting stroke of the control rod.

Embodiment 2

This embodiment provides a reactor control system 100, which includes the control rod drive mechanism 100 provided in the Embodiment 1.

In the control rod drive mechanism 100, a scissor-type lifting-lowering mechanism 113 is used instead of a traditional stepping moving mechanism, which can drive the control rod to continuously rise and fall and has a higher response speed. In addition, the scissor-type lifting-lowering mechanism 113 can enlarge the lift stroke of the control rod, achieve a larger moving stroke in a limited mounting space, and save the available space of the reactor control system. Therefore, the reactor control system provided herein has a larger usable space, and can drive the control rod to continuously long-distance rise and fall.

The above are only preferred embodiments of the present disclosure, and are not intended to limit the scope of the present disclosure. Any changes, modifications and improvements made by those skilled in the art without departing from the spirit of the present disclosure shall fall within the scope of the present disclosure.

What is claimed is:
1. A control rod drive mechanism, comprising
a lifting-lowering assembly;
a mounting assembly; and
a release assembly;

wherein the mounting assembly is configured to mount a control rod;

the lifting-lowering assembly comprises a fixing component, a scissor-type lifting-lowering mechanism and a lifting-lowering component; an end of the scissor-type lifting-lowering mechanism close to the fixing component is connected to the fixing component, and an end of the scissor-type lifting-lowering mechanism away from the fixing component is connected to the lifting-lowering component; the scissor-type lifting-lowering mechanism is configured to drive the lifting-lowering component to move close to or away from the fixing component;

the release assembly is movably arranged on the lifting-lowering component, and is detachably connected to the mounting assembly; and the release assembly is configured to move relative to the lifting-lowering component when power is off, so as to release the mounting assembly; and the release assembly comprises a slidable main body, an electromagnet, a fixing base and a first elastic component; the slidable main body is in sliding fit with the lifting-lowering component; the mounting assembly is detachably connected to the slidable main body; the electromagnet and the fixing base are arranged on the lifting-lowering component; two ends of the first elastic component are respectively connected to the fixing base and the slidable main body; the electromagnet is configured to attract the slidable main body when power is on; and the first elastic component is configured to drive the slidable main body to move on the lifting-lowering component in a direction away from the electromagnet when power is off, so as to disconnect the slidable main body from the mounting assembly.

2. The control rod drive mechanism of claim 1, wherein the slidable main body comprises a support frame, a first support block, a second support block and an armature; the support frame is in sliding fit with the lifting-lowering component; the armature is arranged on an outer wall of an end of the support frame near the electromagnet; the first support block and the second support block are arranged spaced apart on an inner wall of an end of the support frame away from the electromagnet; and the mounting assembly is straddledly arranged between the first support block and the second support block.

3. The control rod drive mechanism of claim 1, wherein a side of the lifting-lowering component close to the fixing component is provided with a guide sliding groove; the slidable main body is in sliding fit with the guide sliding groove; the electromagnet and the fixing base are respectively arranged in the guide sliding groove; a bottom wall of the guide sliding groove is penetratedly provided with a release hole, and the mounting assembly penetrates through the release hole to be detachably connected to the slidable main body; and when the mounting assembly is disconnected from the slidable main body, the mounting assembly moves in a direction away from the slidable main body through the release hole.

4. The control rod drive mechanism of claim 1, wherein the mounting assembly comprises a mounting component and a straddling component; an end of the straddling component close to the mounting component is connected to a side of the mounting component; an end of the straddling component away from the mounting component is straddledly provided on the release assembly; and a side of the mounting component away from the straddling component is configured for arrangement of a plurality of control rods.

5. The control rod drive mechanism of claim 4, wherein the mounting assembly further comprises a second elastic component; an end of the second elastic component close to the mounting component is arranged on a side of the mounting component close to the release assembly; and an end of the second elastic component away from the mounting component abuts against a side of the lifting-lowering component away from the fixing component.

6. The control rod drive mechanism of claim 1, wherein the scissor-type lifting-lowering mechanism comprises a scissor-type bracket and a drive component; the drive component is arranged on the fixing component; two ends of the scissor-type bracket are respectively connected to the fixing component and the lifting-lowering component; and a movable side of an end of the scissor-type bracket connected to the fixing component is connected to an output end of the drive component, so as to slide on the fixing component under drive of the drive component.

7. The control rod drive mechanism of claim 6, wherein the scissor-type lifting-lowering mechanism further comprises a connecting rod; the scissor-type bracket comprises a plurality of scissor-type brackets; a movable side of an end of each of the plurality of scissor-type brackets connected to the fixing component is connected via the connecting rod; the output end of the drive component is connected to the connecting rod; and the connecting rod is configured to drive the movable side of the end of each of the plurality of scissor-type brackets to synchronously slide on the fixing component under drive of the drive component.

8. The control rod drive mechanism of claim 7, wherein a first slide rail is provided on the fixing component; a first pulley is provided on the movable side of the end of each of the plurality of scissor-type brackets connected to the fixing component; the first pulley is in sliding fit with the first slide rail; a second slide rail is provided on the lifting-lowering component; a second pulley is provided on a movable side of an end of each of the plurality of scissor-type brackets connected to the lifting-lowering component; the second pulley is in sliding fit with the second slide rail; and the second slide rail is parallel to the first slide rail.

9. A reactor control system, comprising the control rod drive mechanism of claim 1.

* * * * *